(12) United States Patent
Sasai et al.

(10) Patent No.: US 7,098,945 B1
(45) Date of Patent: Aug. 29, 2006

(54) ELECTRONIC CAMERA APPARATUS

(75) Inventors: Toshihiro Sasai, Kyoto (JP); Shuji Kitagawa, Ibaraki (JP)

(73) Assignee: NuCORE Technology, Inc., Santa Clara, CA (US)

( * ) Notice: Subject to any disclaimer, the term of this patent is extended or adjusted under 35 U.S.C. 154(b) by 0 days.

(21) Appl. No.: 09/511,408

(22) Filed: Feb. 23, 2000

(30) Foreign Application Priority Data

Feb. 26, 1999 (JP) .................................. 11-050433

(51) Int. Cl.
H04N 9/73 (2006.01)

(52) U.S. Cl. .................. 348/223.1; 348/234; 348/237; 348/255; 382/274

(58) Field of Classification Search ............ 348/223.1, 348/255, 252, 238, 228.1, 234, 237; 382/274
See application file for complete search history.

(56) References Cited

U.S. PATENT DOCUMENTS

| | | | |
|---|---|---|---|
| 5,196,923 A * | 3/1993 | Ueda et al. ................. 348/647 |
| 5,432,550 A * | 7/1995 | Kwon ......................... 348/255 |
| 5,504,524 A * | 4/1996 | Lu et al. .................... 348/223.1 |
| 5,530,474 A * | 6/1996 | Takei ......................... 348/224.1 |
| 5,534,916 A * | 7/1996 | Sakaguchi ................. 348/222.1 |
| 5,606,392 A * | 2/1997 | Tintera et al. .............. 396/161 |
| 5,644,359 A * | 7/1997 | Ito ............................. 348/223.1 |
| 5,668,596 A * | 9/1997 | Vogel ........................ 348/222.1 |
| 5,712,682 A * | 1/1998 | Hannah ....................... 348/255 |
| 5,737,017 A * | 4/1998 | Udagawa et al. ........... 348/280 |
| 5,870,505 A * | 2/1999 | Wober et al. ............... 382/274 |
| 5,936,668 A * | 8/1999 | Sawanobori et al. ... 348/333.01 |
| 6,526,181 B1 * | 2/2003 | Smith et al. ................ 382/275 |

* cited by examiner

Primary Examiner—Tuan Ho
Assistant Examiner—Chriss S. Yoder
(74) Attorney, Agent, or Firm—Townsend and Townsend and Crew LLP

(57) ABSTRACT

An electronic camera apparatus reads out, from an image sensing device, an image signal which represents a color image constructed by a number of pixels to which predetermined colors are assigned and has pieces of luminance information with analog values representing luminances of the pixels, the luminance information being discrete on a time axis, and generates a desired image from the image signal. The apparatus has a luminance correction section.

9 Claims, 13 Drawing Sheets

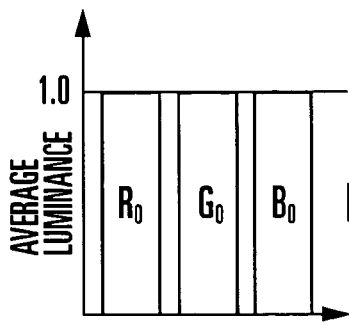
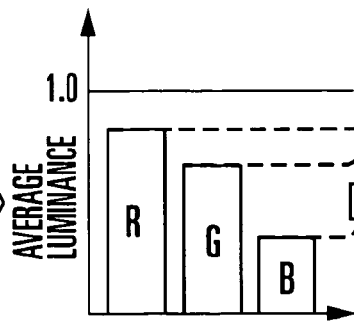
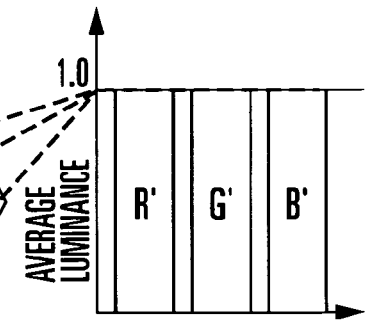
FIG.5A     FIG.5B     FIG.5C
$$\begin{cases} R' = \alpha_R \times R \\ G' = \alpha_G \times G \\ B' = \alpha_B \times B \end{cases}$$
FIG.5D
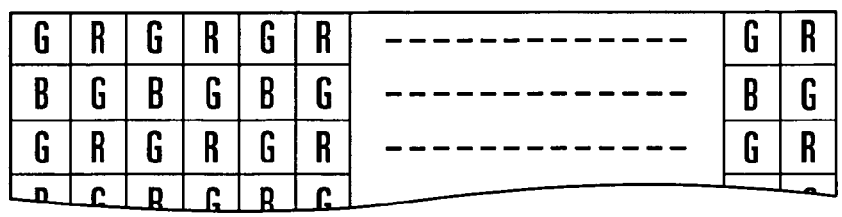
FIG.5E
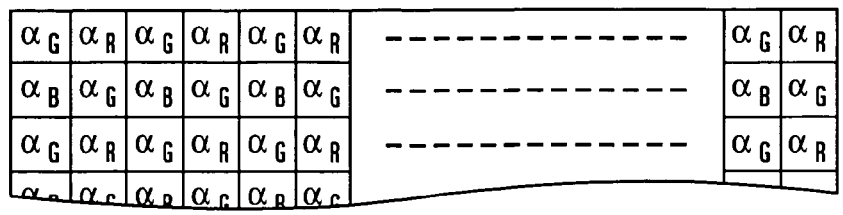
FIG.5F

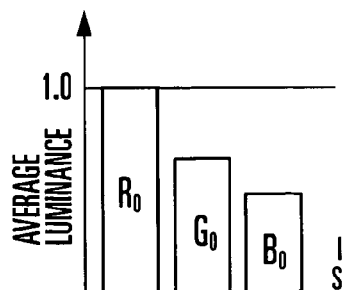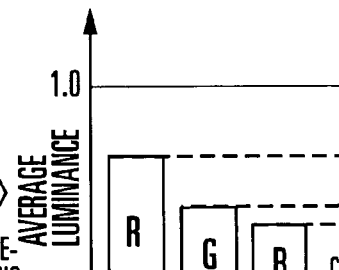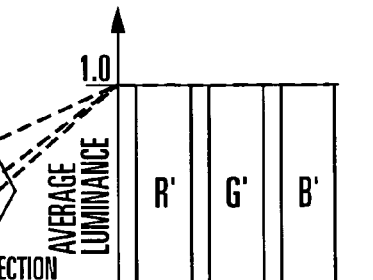
FIG. 8A     FIG. 8B     FIG. 8C
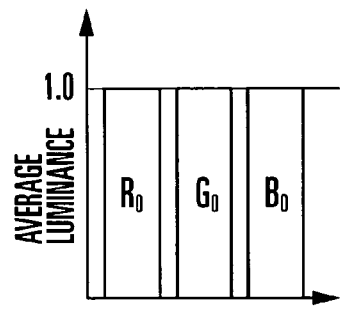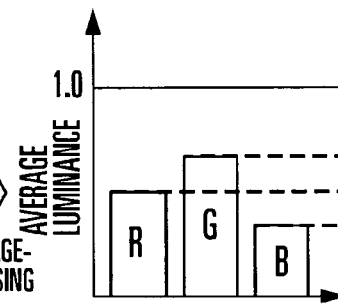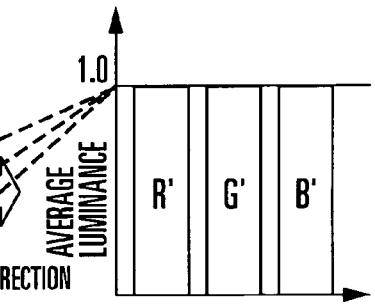
FIG. 8D     FIG. 8E     FIG. 8F
$$\begin{cases} \alpha_K = S_R \cdot \alpha_R + S_G \cdot \alpha_G + S_B \cdot \alpha_B \\ S_R + S_G + S_B = 1 \\ S_R = \{0, 1\} \\ S_G = \{0, 1\} \\ S_B = \{0, 1\} \end{cases}$$
FIG. 8G

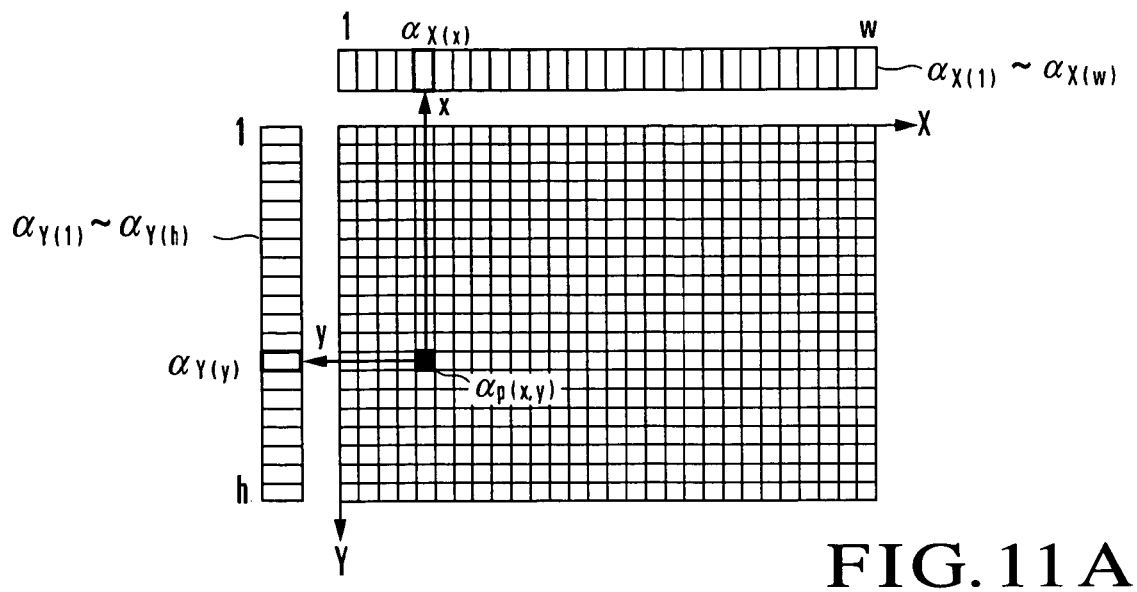
FIG. 11A
$$\begin{cases} \alpha_{p(x,y)} = \alpha_{X(x)} \times \alpha_{Y(y)} \\ \qquad \fallingdotseq \alpha_{X(x)} + \alpha_{Y(y)} \\ \because \alpha_{X(x)} \fallingdotseq 1, \ \alpha_{Y(y)} \fallingdotseq 1 \end{cases}$$
FIG. 11B
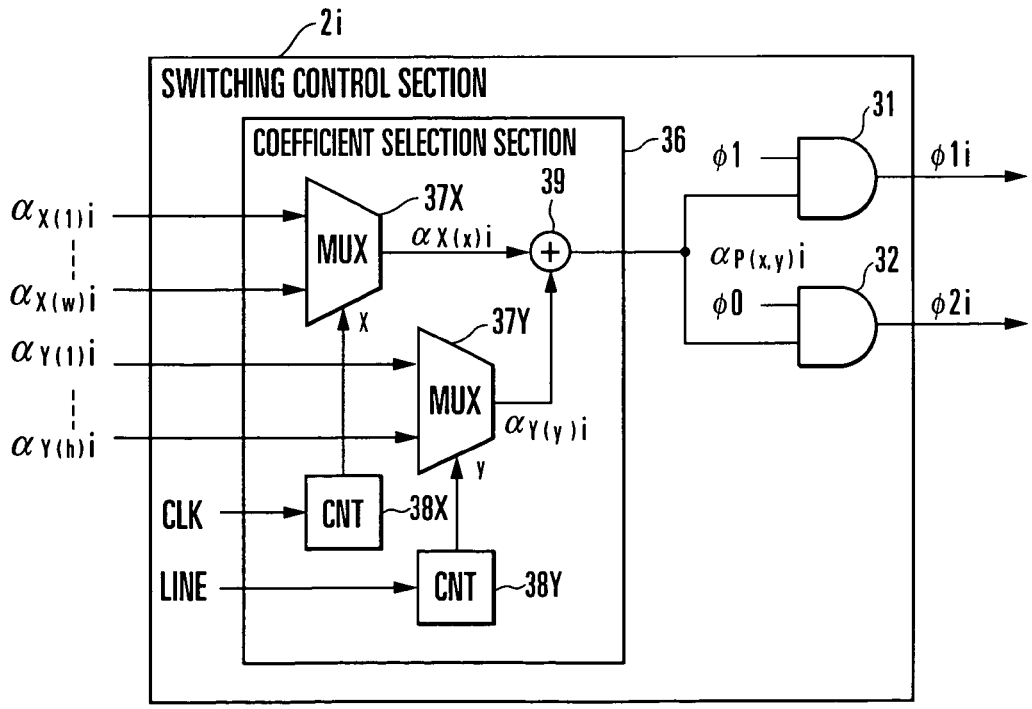
FIG. 12

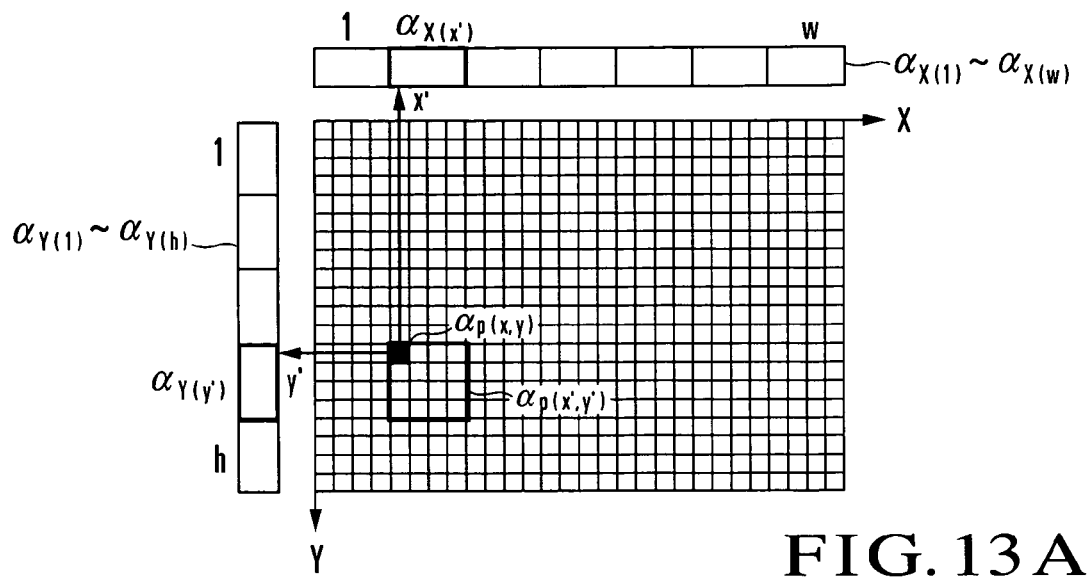
FIG. 13A
FIG. 13B
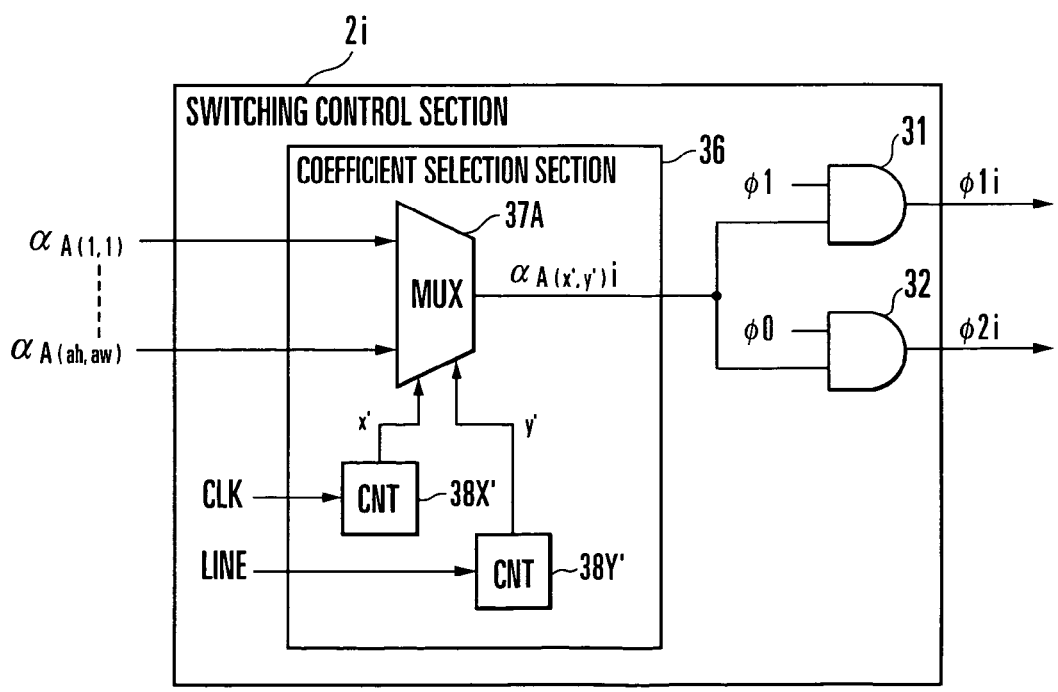
FIG. 14

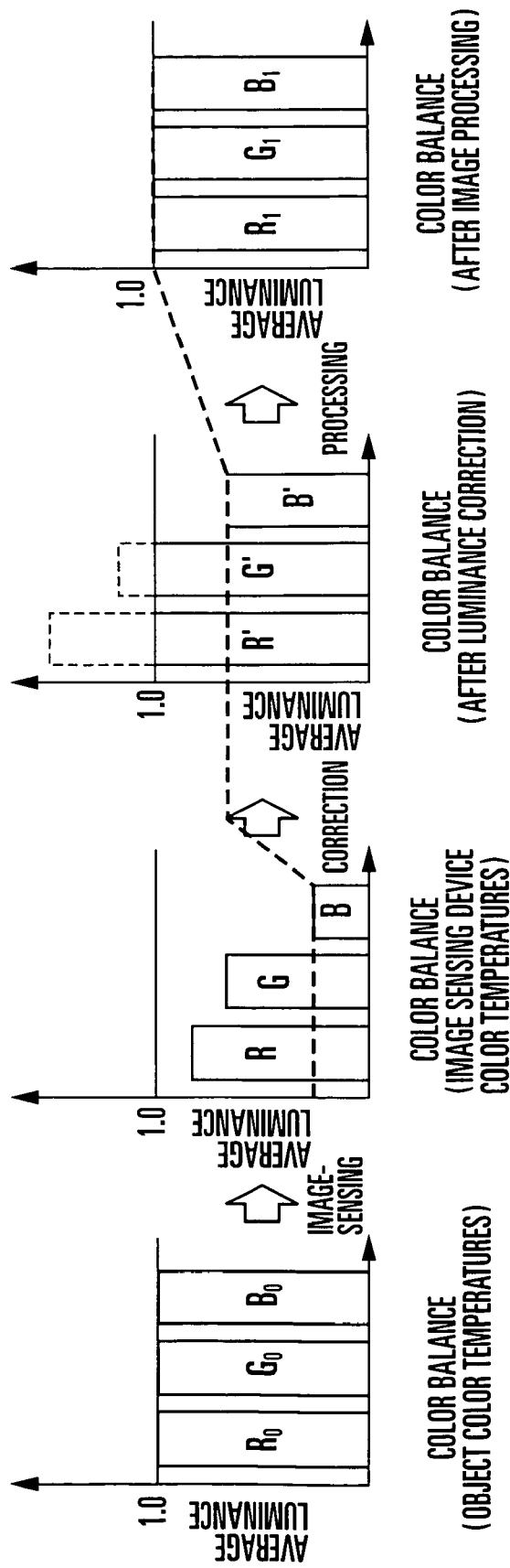

ELECTRONIC CAMERA APPARATUS

BACKGROUND OF THE INVENTION

The present invention relates to an electronic camera apparatus and, more particularly, to an electronic camera apparatus for correcting the luminance level of a luminance signal obtained from an image sensing device having a color filter.

Generally, many electronic camera apparatuses called digital still cameras employ an arrangement for sensing a color image using a color filter formed on one image sensing device.

In this arrangement, an analog image signal is obtained from the image sensing device, in which a color image is represented by assigning predetermined colors to a number of pixels in advance, and pieces of luminance information with analog values representing the luminances of the pixels are discrete on the time axis.

Normally, in sensing a color image, the luminance of an obtained image signal must be corrected in accordance with the type of light source and ambient brightness.

In the electronic camera apparatus, a luminance correction amount is calculated from an image signal obtained by the image sensing device in, e.g., a test photometry mode before image sensing, and an image signal obtained later by pressing the shutter button is corrected using the luminance correction amount.

Assume a case wherein an image signal is converted into digital image data by an A/D converter and then subjected to various image processing operations. After the image signal is A/D-converted, information of details is lost by quantization. For this reason, the image quality obtained by subsequent image processing is largely influenced by the quality of original information.

Especially, a pixel with low luminance has a very small amount of information and is also greatly influenced by noise and the like. Normally, before A/D conversion, an analog signal is directly amplified to minimize damage to the information amount of such pixel with low luminance.

FIG. 16 shows a conventional electronic camera apparatus.

A color image sensed by an image sensing device 101 in the test photometry mode is input to a variable gain amplification section 102 as an image signal 111.

The image signal 111 is amplified by the gain controlled by a gain control section 103, converted into a digital signal by an A/D conversion section 104, and temporarily stored in a digital memory 105 as image data.

Image data 113 is read out from the digital memory 105. A luminance detection section 106 detects statistical luminance information such as average luminance and maximum and minimum luminance values in units of colors of the image data 113.

In accordance with the detection result from the luminance detection section 106, a control section 107 calculates a correction coefficient common to all colors. The gain of the variable gain amplification section 102 is set by the gain control section 103 on the basis of the correction coefficient.

When an image signal is obtained indoors under an incandescent lamp, the white balance of the obtained color image is bad, and the luminance of blue (B) tends to extremely lower, as shown in FIGS. 17A to 17D.

For example, it should be balanced as shown in FIG. 17A under ideal light source, the output signal from the image sensing device 101 are not balanced due to the influence of the incandescent lamp, as shown in FIG. 17B.

In this case, the control section 107 calculates a correction coefficient that corrects with which the luminance of blue (B) has an appropriate value to some degree, and a corresponding gain is set by the gain control section 103.

In the subsequent image sensing mode, pieces of luminance information contained in the image signal 111 from the image sensing device 101 are amplified by the gain based on the correction coefficient at the same magnification for all colors, as shown in FIG. 17C.

Then, as described above, the image signal is converted into a digital signal by the A/D conversion section 104 and temporarily stored in the digital memory 105 as new image data.

After that, new image data 113 is read out from the digital memory 105, and the statistical luminance information of the new image data 113 is detected by the luminance detection section 106 in the same way as described above.

Accordingly, the control section 107 determines whether image processing is necessary and calculates parameters therefor. An image processing section 108 executes predetermined image processing for the new image data 113, e.g., processing of further amplifying the luminance of blue (B).

With this processing, image data color-balanced to some extent is generated, as shown in FIG. 17D, and stored in the digital memory 105.

The image processing section 108 also performs, other processing such as color correction, contour extraction, and compression.

However, such a conventional electronic camera apparatus has the following problems because the variable gain amplifier provided on the output side of the image sensing device amplifies the image signal obtained from the image sensing device by the same gain for all colors and all pixel positions.

Referring to FIG. 16, if the image signal 111 obtained from the image sensing device 101 has extremely different luminances of red, green, and blue (RGB), a color that originally obtains satisfactory luminance is saturated when amplified by the variable gain amplification section 102. The luminance distribution of the image shifts to the bright side, resulting in poor image quality.

For example, referring to FIG. 17C, when the luminance of blue (B) is amplified to an appropriate value, red and green (RG) exceed the input range (0 to 1.0) of the A/D conversion section 104.

Hence, the luminance distribution shifts to the high luminance side. In addition, all the luminance values exceeding the input range become the highest luminance value (1.0), and the original luminance information is lost, resulting in an image with poor quality.

Normally, in the optical system used to focus light to the image sensing device, light at corners is attenuated as compared to the central portion due to the Cosine Fourth Law or shading, as known as vignetting.

However, the variable gain amplification section 102 of the conventional electronic camera apparatus shown in FIG. 16 amplifies the entire image region by the same gain and therefore cannot correct vignetting.

Such vignetting may be corrected by filter processing by the image processing section on the output side. In fact, vignetting tends not to be corrected because the processing takes a time and consumes power.

SUMMARY OF THE INVENTION

The present invention has been made to solve the above problems, and has as its object to provide an electronic camera apparatus capable of obtaining an image with appropriate luminance balance without degrading the image quality.

In order to achieve the above object, according to the present invention, there is provided an electronic camera apparatus for reading out, from an image sensing device, an image signal which represents a color image constructed by a number of pixels to which predetermined colors are assigned and has pieces of luminance information with analog values representing luminances of the pixels, the luminance information being discrete on a time axis, and generating a desired image from the image signal, comprising a luminance correction section for generating individual correction coefficients from a plurality of correction coefficients in units of pixels, correcting corresponding luminance information in the image signal on the basis of each correction coefficient, and outputting a new image signal used for image generation.

BRIEF DESCRIPTION OF THE DRAWINGS

FIGS. 5A to 5F are explanatory views showing processing of correcting luminance in units of colors;

FIGS. 8A to 8G are explanatory views showing an application example to luminance correction;

FIGS. 11A and 11B are explanatory views showing a method of calculating a luminance correction coefficient for vignetting;

FIG. 12 is a block diagram showing the arrangement of a switching control section (when luminance correction for vignetting is performed);

FIGS. 13A and 13B are explanatory views showing another method of calculating a luminance correction coefficient for vignetting;

FIG. 14 is a block diagram showing the arrangement of a switching control section (when luminance is corrected in units of regions using individual correction coefficients);

FIGS. 17A to 17D are explanatory views showing a conventional color balance correction method.

DESCRIPTION OF THE PREFERRED EMBODIMENTS

The present invention will be described next with reference to the accompanying drawings.

Figure 1:
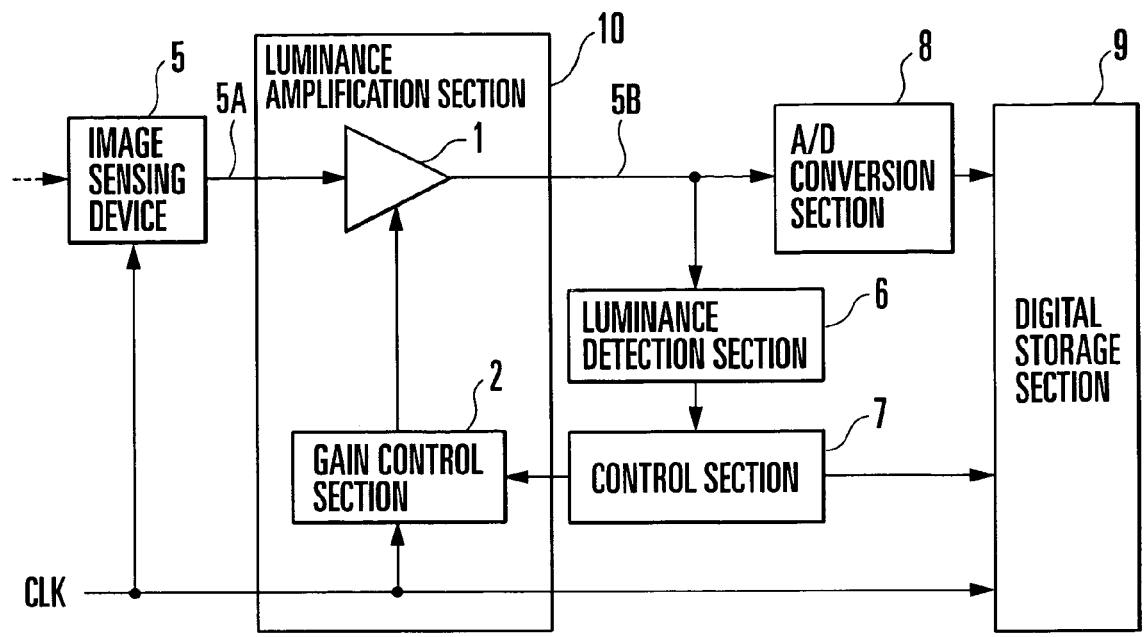
FIGS. 1A and 1B are block diagrams showing an electronic camera apparatus according to an embodiment of the present invention.
Figure 1:
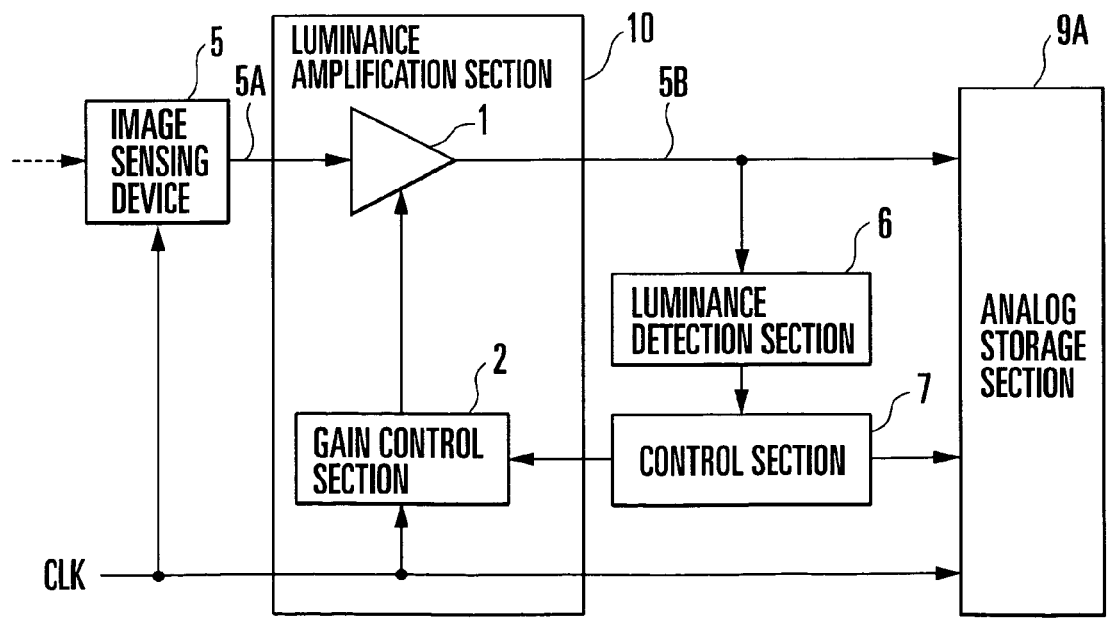

FIGS. 1A and 1B show an electronic camera apparatus according to an embodiment of the present invention. FIG. 1A shows an arrangement in which image data is stored as digital data. FIG. 1B shows an arrangement in which image data is stored as analog data.

Referring to FIGS. 1A and 1B, reference numeral 5 denotes an image sensing device such as a color CCD; and 10, a luminance correction section which amplifies an image signal 5A, obtained by the image sensing device 5, by an arbitrary gain in units of pixels to correct luminance.

A luminance detection section 6 detects, from an image signal 5B amplified by the luminance correction section 10, statistical luminance information such as the average luminance value and maximum and minimum luminance values in units of colors and, additionally, commonly for all colors. A control section 7 calculates a luminance correction coefficient for each pixel and, additionally, that common to all pixels on the basis of the statistical luminance information detected by the luminance detection section 6.

An A/D conversion section 8 converts the image signal 5B into a digital signal. A digital storage section 9 stores the digital image signal converted by the A/D conversion section 8 as image data.

The image signal 5A obtained from the image sensing device 5 is generally called a color interleaved signal. This image signal represents a color image constructed by a number of pixels to which predetermined colors (e.g., red, green, and blue: RGB) are assigned in advance. In this image signal, pieces of luminance information with analog values representing the luminances of the pixels are discrete on the time axis.

A clock signal CLK is synchronized with each luminance value in the image signal 5A.

An image processing section using, e.g., a DSP may be connected to the output side of the digital storage section 9 or an analog storage section 9A as needed, as in the prior art, to perform image processing such as color correction, edge extraction, and compression for the image data read out from the storage section 9 or 9A.

The digital storage section 9 or analog storage section 9A may be constructed by a detachable storage medium.

The luminance correction section 10 will be described next with reference to FIG. 2.

Figure 2:
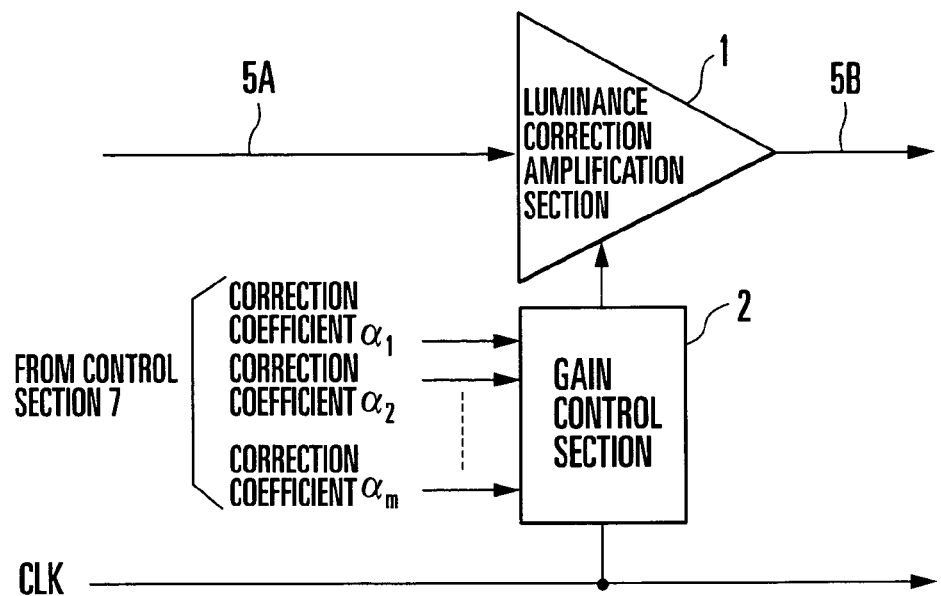
FIG. 2 is a block diagram showing the arrangement of a luminance correction section.

FIG. 2 shows the arrangement of the luminance correction section.

Referring to FIG. 2, a luminance correction amplification section 1 amplifies the image signal 5A from the image sensing device 5 by an arbitrary gain in units of pixels. A gain control section 2 sets and controls the gain of the luminance correction amplification section 1 in synchronism with the clock CLK in units of pixels on the basis of a plurality of correction coefficients $\alpha_1$ to $\alpha_m$ (m is an integer of 2 or more).

The luminance correction amplification section 1 will be described next with reference to FIG. 3.

Figure 3:
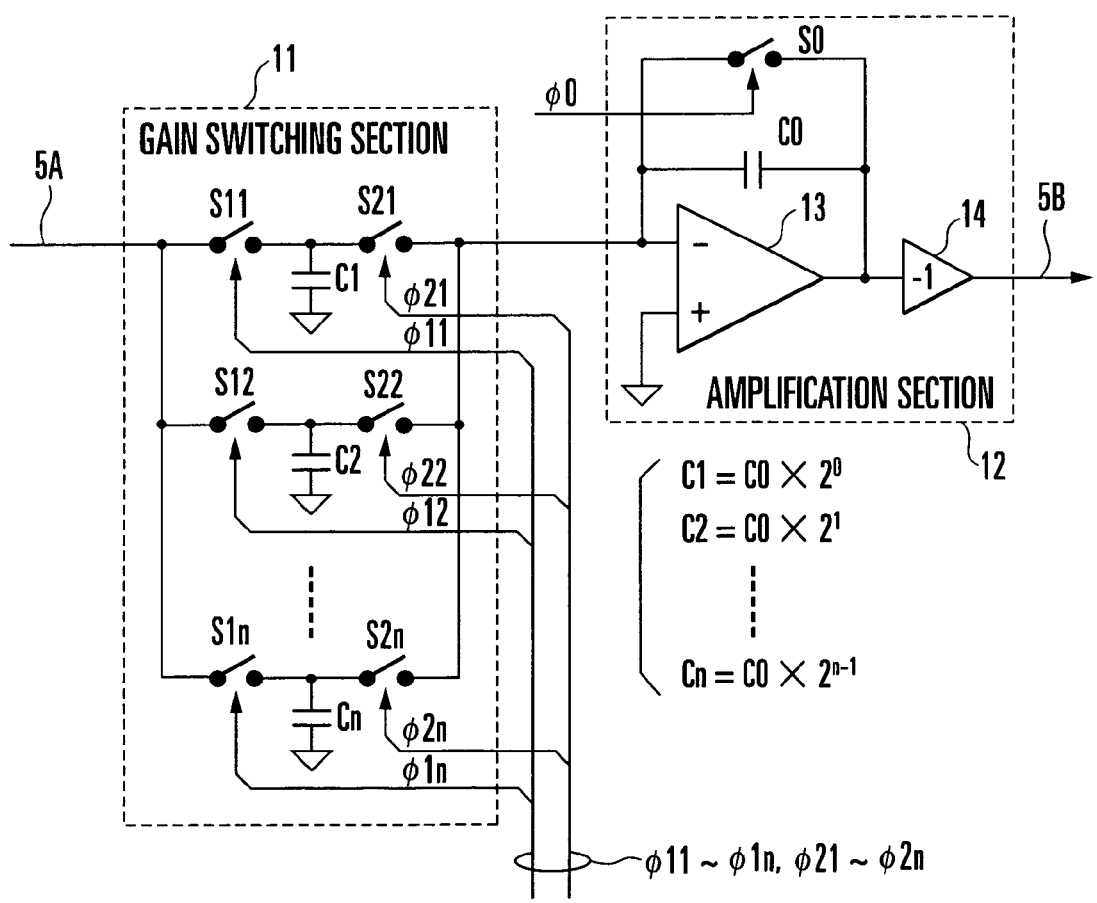
FIG. 3 is a block diagram showing the arrangement of a luminance correction amplification section.

FIG. 3 shows the arrangement of the luminance correction amplification section that is constructed using a switched capacitor circuit.

Referring to FIG. 3, a gain switching section 11 selects the magnitudes of capacitance components connected in parallel to the image signal 5A in accordance with switching signals $\phi_{11}$ to $\phi_{1n}$ and $\phi_{21}$ to $\phi_{2n}$ (n is an integer of 2 or more) from the gain control section 2, thereby switching the gain. An amplification section 12 amplifies and outputs the image signal 5A on the basis of the gain determined by the capacitance ratio of the capacitance component selected by the gain switching section 11 to a fixed capacitance component.

The gain switching section 11 has a plurality of capacitive elements $C_1$ to $C_n$ having different capacitances and arranged in parallel with respect to the image signal 5A.

Switches $S_{11}$ to $S_{1n}$ and $S_{21}$ to $S_{2n}$ are connected to the input and output sides of the capacitive elements $C_1$ to $C_n$. These switches are ON/OFF-controlled by the switching signals $\phi_{11}$ to $\phi_{1n}$ and $\phi_{21}$ to $\phi_{2n}$ from the gain control section 2.

In the amplification section 12, an operational amplifier 13 and inverting amplifier 14 are serially connected.

A capacitive element $C_0$ as a fixed capacitance component and switch $S_0$ are parallelly connected between the inverting input (−) and the output of the operational amplifier.

Especially, the capacitance ratios of the capacitive element $C_0$ to the capacitive elements $C_1$ to $C_n$ are set at $2^0$ to $2^{n-1}$, respectively. Bits that represent desired gains by n binary digits are made to correspond to the capacitive elements $C_1$ to $C_n$, respectively.

The gain control section 2 will be described next with reference to FIG. 4.

Figure 4:
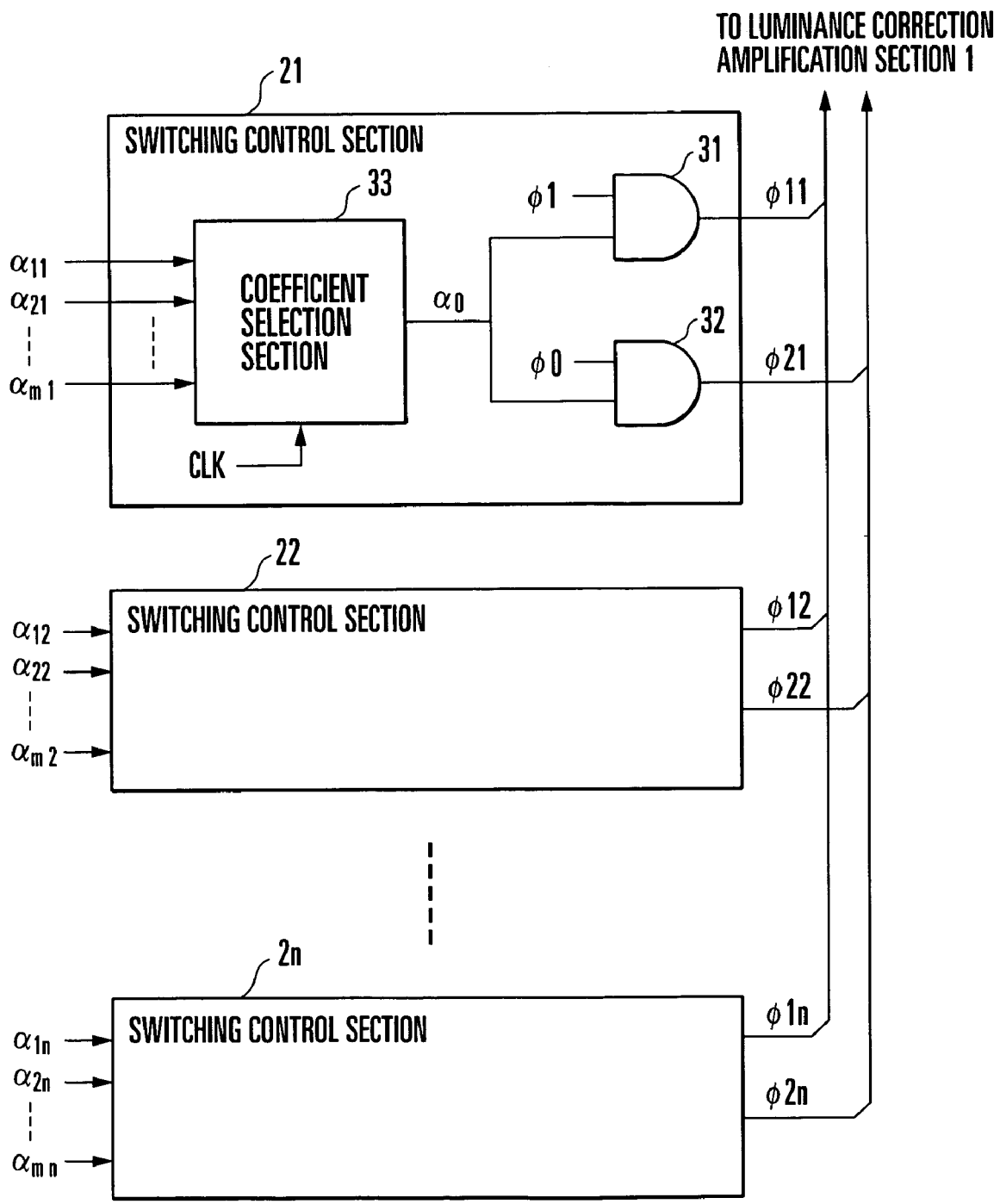
FIG. 4 is a block diagram showing the arrangement of a gain control section.

FIG. 4 shows the arrangement of the gain control section in which n switching control sections 21 to 2n are parallelly arranged in correspondence with the bits that represent desired gains by n binary digits, e.g., the capacitive elements $C_1$ to $C_n$ of the gain switching section 11, which are set in the luminance correction amplification section 1.

Bits $\alpha_{11}$ to $\alpha_{1n}$, $\alpha_{21}$ to $\alpha_{2n}$, ... $\alpha_{m1}$ to $\alpha_{mn}$ corresponding to the correction coefficients $\alpha_1$ to $\alpha_m$ are parallelly input to the switching control sections 21 to 2n, respectively. One of these bits is selected by a coefficient selection section 33 on the basis of the clock CLK and output as a correction coefficient $\alpha_0$.

On the basis of clocks $\phi_0$ and $\phi_1$ synchronized with the clock CLK, the switching signals $\phi_{11}$ to $\phi_{1n}$ and $\phi_{21}$ to $\phi_{2n}$ are generated by gates 31 and 32.

As the first embodiment of the present invention, a case wherein the luminance of the image signal 5A formed from an RGB color interleaved signal is corrected in units of colors, i.e., red, green, and blue (RGB) using individual correction coefficients $\alpha_R$, $\alpha_G$, and $\alpha_B$ will be described next with reference to the accompanying drawings.

FIGS. 5A to 5F show processing of correcting luminance in units of colors.

Assume that although the object color temperatures of all of red, green, and blue (RGB) are balanced, as shown in FIG. 5A, the image sensing device color sensitivities of the image sensing device 5 are not balanced due to the influence of an incandescent lamp, as shown in FIG. 5B.

In this case, to obtain white balance as shown in FIG. 5C, luminance need be corrected in units of colors using individual correction coefficients, as shown in FIG. 5D.

In actual image sensing, images are continuously received from the image sensing device 5, as in a general electronic camera.

The gain of the luminance correction section 10 is set at an appropriate value (e.g., 1×), and an image is obtained. When the shutter button is pressed, the correction coefficients are calculated by the control section 7 on the basis of statistical luminance information detected by the luminance detection section 6 from the image signal of a preceding (e.g., immediately preceding) image.

When the image signal 5A is expressed as a two-dimensional plane, i.e., a color frame, a checkerboard pattern of RGB is normally formed, as shown in FIG. 5E.

Hence, the individual correction coefficients for the respective colors need be ON/OFF-controlled in accordance with the color layout, as shown in FIG. 5F.

Figure 6:
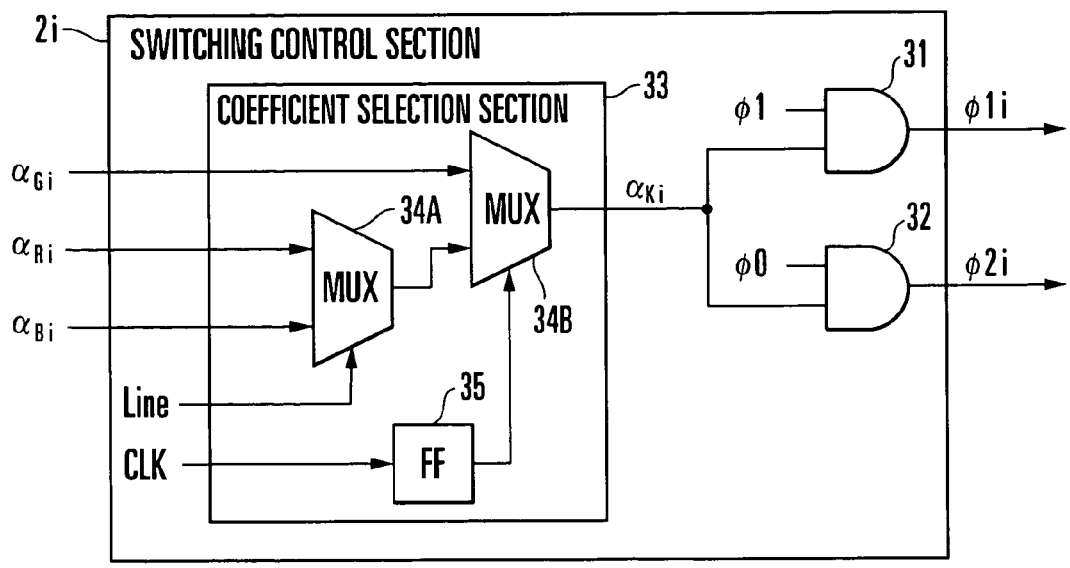
FIG. 6 is a block diagram showing the arrangement of a switching control section (when luminance is individually corrected in units of colors)

FIG. 6 shows the arrangement of the switching control section applied when luminance is individually corrected in units of colors. Especially, FIG. 6 shows an arrangement corresponding to the ith (i is 1 to n) bit.

Referring to FIG. 6, the coefficient selection section 33 has a switching section (MUX) 34A for selectively outputting a red correction coefficient $\alpha_{Ri}$ and blue correction coefficient $\alpha_{Bi}$ on the basis of a signal Line representing switching between pixel lines "GRGR . . ." and "BGBG . . .".

The coefficient selection section 33 also has a switching section (MUX) 34B for selectively outputting the output from the switching section 34A and a green correction coefficient $\alpha_{Gi}$ on the basis of the clock CLK synchronized with each pixel.

The coefficient selection section 33 selectively outputs a color correction coefficient $\alpha_{Ki}$ corresponding to each pixel position represented by the clock CLK, as shown in FIG. 5F.

On the basis of the clocks $\phi_0$ and $\phi_1$, the switching signals $\phi_{11}$ and $\phi_{21}$ are generated by the gates 31 and 32.

A flip-flop (FF) 35 is provided to hold the clock CLK for only a period corresponding to one pixel and output the clock.

The signal Line can be generated by counting the clocks CLK corresponding to the number of pixels of one line.

Figure 7:
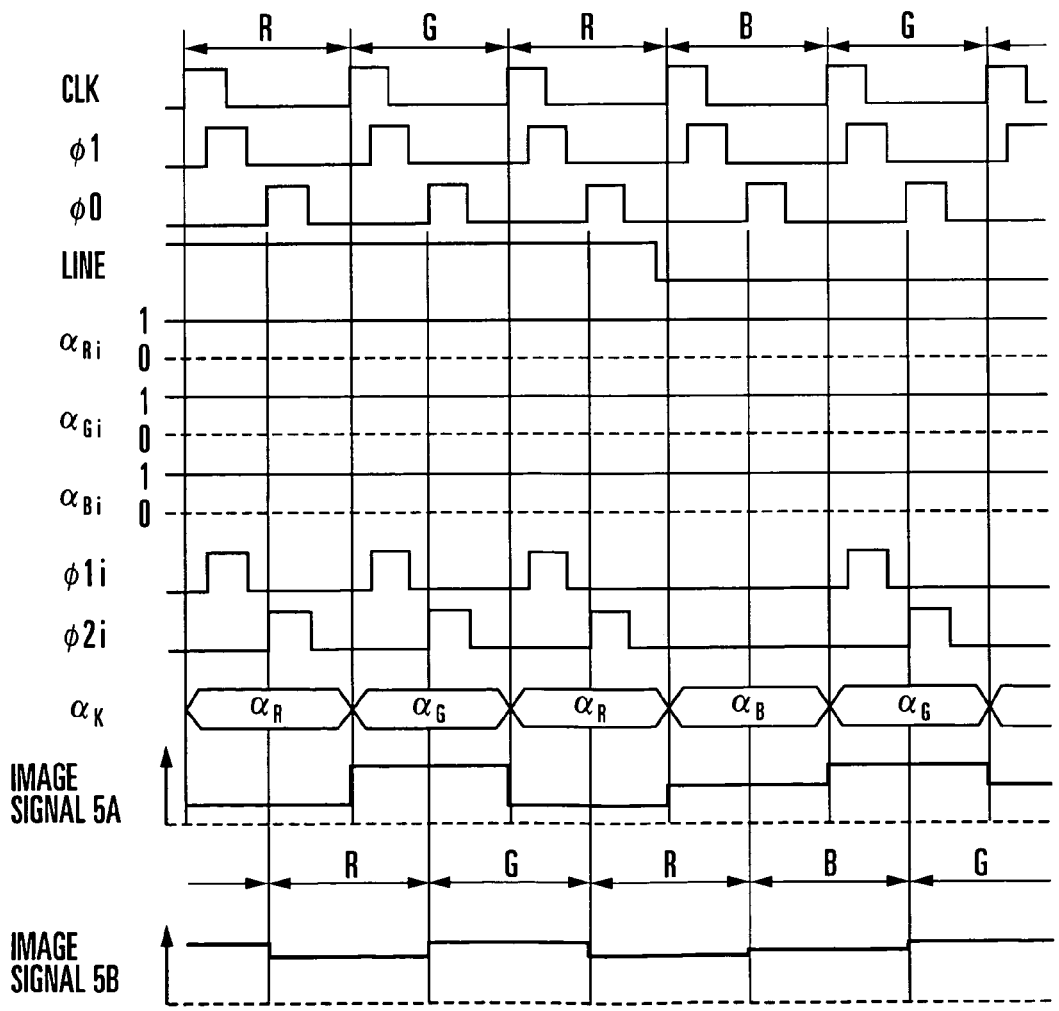
FIG. 7 is a timing chart showing the operation of the gain control section.

As shown in the timing chart of FIG. 7, the switching control section 2i of the ith bit selects the red correction coefficient $\alpha_{Ri}$ (in this case, "1") in the R section of a red pixel, and the entire gain control section 2 outputs a correction coefficient $\alpha_R$ as the correction coefficient $\alpha_{Ki}$.

The gain switching section 11 of the luminance correction amplification section 1 turns on/off the switches $S_{11}$ to $S_{1n}$ and $S_{21}$ to $S_{2n}$ in accordance with the switching signals $\phi_{11}$ to $\phi_{1n}$ and $\phi_{21}$ to $\phi_{2n}$ representing the correction coefficient $\alpha_R$.

Of the capacitive elements $C_1$ to $C_n$, only capacitive elements whose switches $S_{11}$ to $S_{1n}$ are turned on are charged in correspondence with the amplification voltage of the image signal 5A, i.e., the pixel level of red pixels corresponding to the R section.

After that, only charges in the capacitive elements whose switches $S_{21}$ to $S_{2n}$ are ON are applied to the amplification section 12. As a result, the signal is amplified by the capacitance ratio of the capacitive elements whose switches $S_{21}$ to $S_{2n}$ are ON to the capacitive element $C_0$ and output.

In this way, the correction coefficients $\alpha_{Ri}$, $\alpha_{Gi}$, and $\alpha_{Bi}$ corresponding to RGB colors are selected by the gain control section 2 in the R, G, and B sections corresponding to the pixels. In accordance with the correction coefficient, the image signal 5A is amplified by the luminance correction amplification section 1 in units of colors using individual gains, so the image signal 5B with corrected white balance is obtained.

Hence, unlike the prior art in which the image signal is amplified using a gain common to all colors, the image signal can be amplified in units of colors using appropriate gains without saturating a color with satisfactory luminance, and an image with appropriate luminance can be obtained without degrading the image quality.

In addition, since the luminance of an analog image signal is corrected, the signal can be processed at a high speed with a small circuit scale, and power consumption can also be reduced, as compared to a case wherein data processing done in digital domain by an image processing section.

As an expansion example of such light source correction, the scene of an image may be estimated using various types of statistical luminance information, and the image signal may be corrected in units of colors using correction coefficients optimum to the scene.

For example if it is determined a scene at the sunset, the correlation coefficients of the respective colors are set not to reduce reddishness too much, thereby adjusting white balance without losing the feature of the scene.

An example of light source correction has been described above. However, the present invention is not limited to this.

FIGS. 8A to 8G show an application example of luminance correction.

For example, as shown in FIG. 8A, when the color temperature of an object originally has a variation, the present invention can be applied as dynamic range correction for correcting the variation in color temperature.

More specifically, when the image signal 5A with characteristics shown in FIG. 8B is obtained from the image sensing device 5, correction coefficients of the respective colors are calculated and set such that the range can be effectively used by the changes in luminance of the colors, thereby obtaining the image signal 5B with satisfactory luminance balance as shown in FIG. 8C.

As shown in FIG. 8D, when the image sensing device 5 itself has a variation in sensitivity although the object itself has no variation in color temperature, the present invention can be applied as sensitivity correction for correcting the variation in sensitivity.

More specifically, when the image signal 5A with characteristics shown in FIG. 8E is obtained from the image sensing device 5, correction coefficients are calculated and set such that the luminance level of a color with low sensitivity is largely amplified, thereby obtaining the image signal 5B with satisfactory luminance balance as shown in FIG. 8F.

As is apparent from the above description, it can be expressed that the luminance correction section 10 of the present invention performs processing as shown in FIG. 8G.

More specifically, a correction coefficient $\alpha_K$ in units of pixels contained in the image signal 5A is represented by the sum of products of correction coefficients $\alpha_R$, $\alpha_G$, and $\alpha_B$ corresponding to the respective colors and switch coefficients SR, SG, and SB which are "1" only when colors corresponding to the pixels are red, green, and blue (RGB), and "0" otherwise.

In the above description, as shown in FIGS. 1A and 1B, the luminance detection section 6 for detecting, from the analog image signal 5B output from the luminance correction section 10, statistical luminance information such as the average luminance value and maximum and minimum luminance values in units of colors and, additionally, commonly for all colors is provided and, on the basis of the statistical luminance information obtained by the luminance detection section 6, the control section 7 calculates the correction coefficient $\alpha$ to be input to the gain control section 2.

Figure 9A:
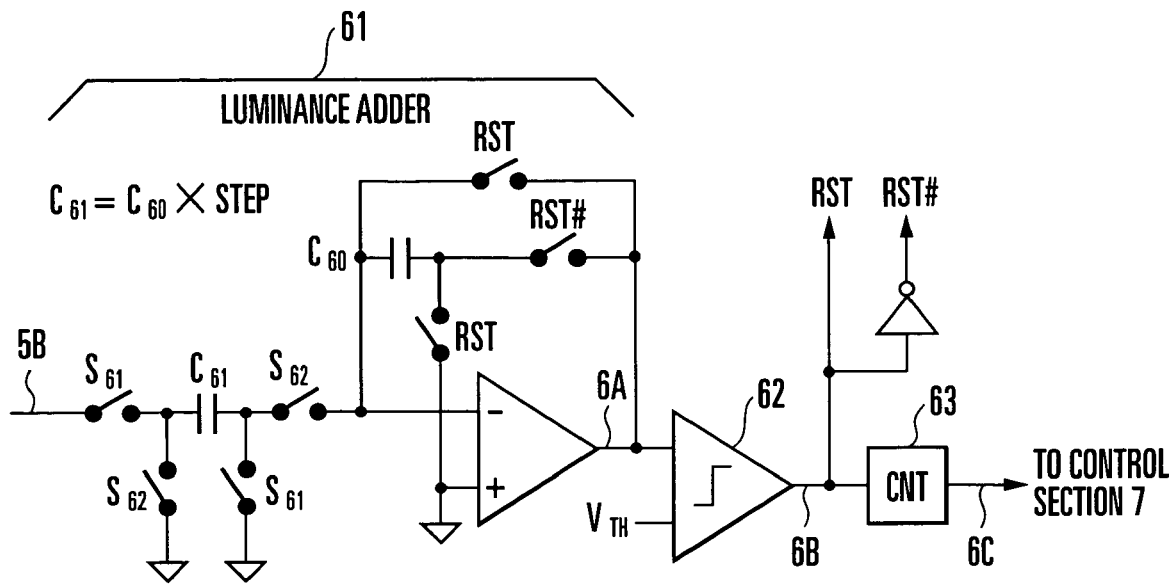
FIGS. 9A and 9B are explanatory views showing the arrangement of a luminance detection section.
Figure 9B:
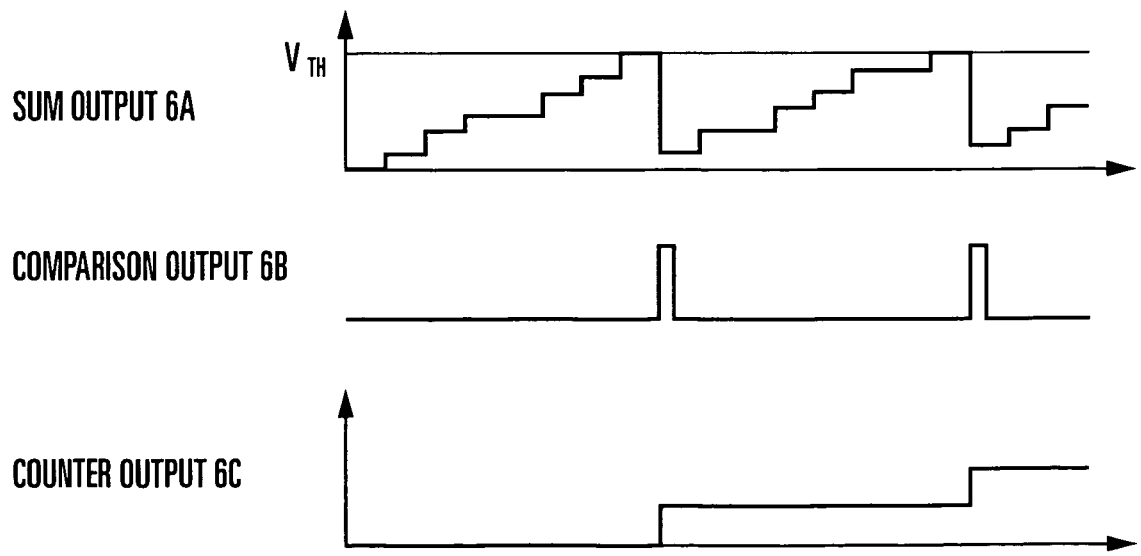

FIGS. 9A and 9B show the arrangement of the luminance detection section. FIG. 9A shows a circuit for detecting the average luminance value of only pixels of a predetermined color, and FIG. 9B shows an operation example.

The luminance detection section comprises a luminance adder 61 for adding pixel values (voltage values) of a predetermined color using a switched capacitor and outputting the result, a comparator 62 for comparing a sum output 6A from the luminance adder 61 with a threshold value $V_{TH}$, and a counter 63 for counting a comparison output 6B from the comparator 62 and outputting a counter output 6C to the control section 7 as an average luminance value.

Switches S61 and S62 of the luminance adder 61 are alternately turned on without any overlapping in a period corresponding to pixels of a predetermined color of the image signal 5B, thereby storing, in a capacitive element C60, charges stored in a capacitive element C61.

With this operation, the sum output 6A gradually increases, as shown in FIG. 9B. When it has reached the threshold value $V_{TH}$, the comparison output 6B from the comparator 62 is inverted. This comparison output 6B is counted by the counter 63 and output as the counter output 6C.

In this case, the ratio of an increase in the sum output 6A to the threshold value $V_{TH}$ (a change in the counter output 6C), i.e., the resolution is determined by a capacitance ratio STEP of the capacitive element C60 to the capacitive element C61.

Since statistical luminance information is directly detected from the analog image signal, the statistical luminance information of desired color pixels or all pixels can be accurately detected at a high speed without using any A/D converter.

In the above description, the correction coefficient $\alpha$ of the gain control section 2 is calculated and set by the control section 7 in units of image signals 5A obtained by the image sensing device 5. However, for fixed luminance correction in the apparatus, a fixed correction coefficient may be used.

For example, a correction coefficient used for sensitivity correction of the image sensing device 5 or sensitivity correction for vignetting by an optical system (to be described later) may be obtained by measurement in advance and registered in, e.g., a ROM.

The second embodiment of the present invention in which the present invention is applied to light attenuation correction for vignetting of an optical system will be described next with reference to the accompanying drawings.

Figure 10:
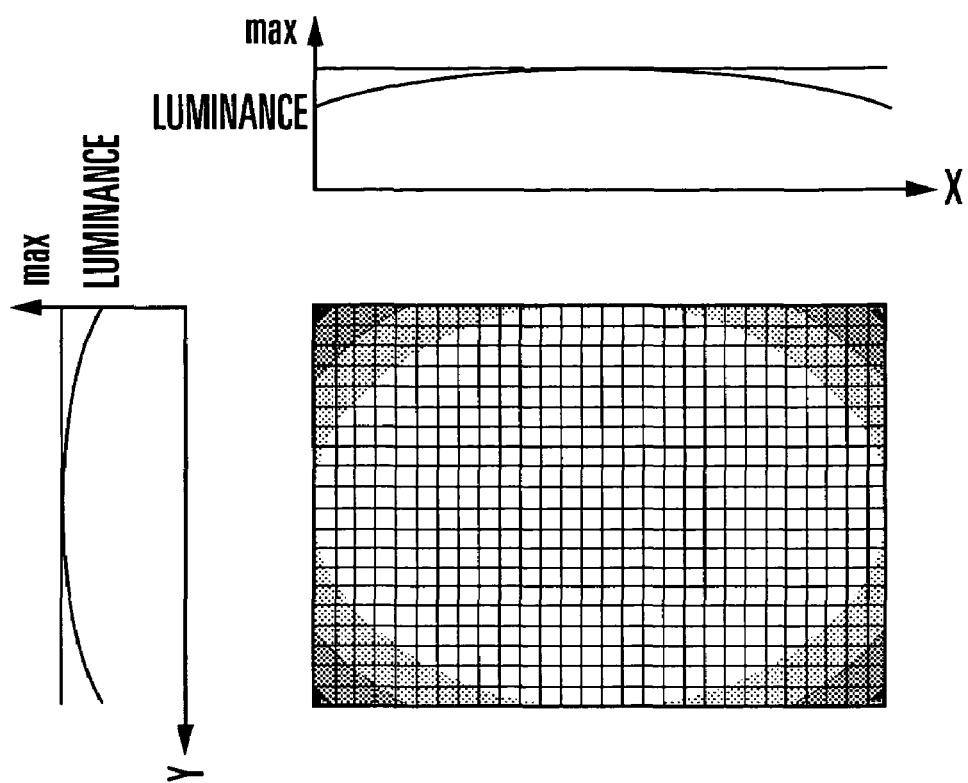
FIGS. 10A and 10B are explanatory views showing vignetting by an optical system.
Figure 10:
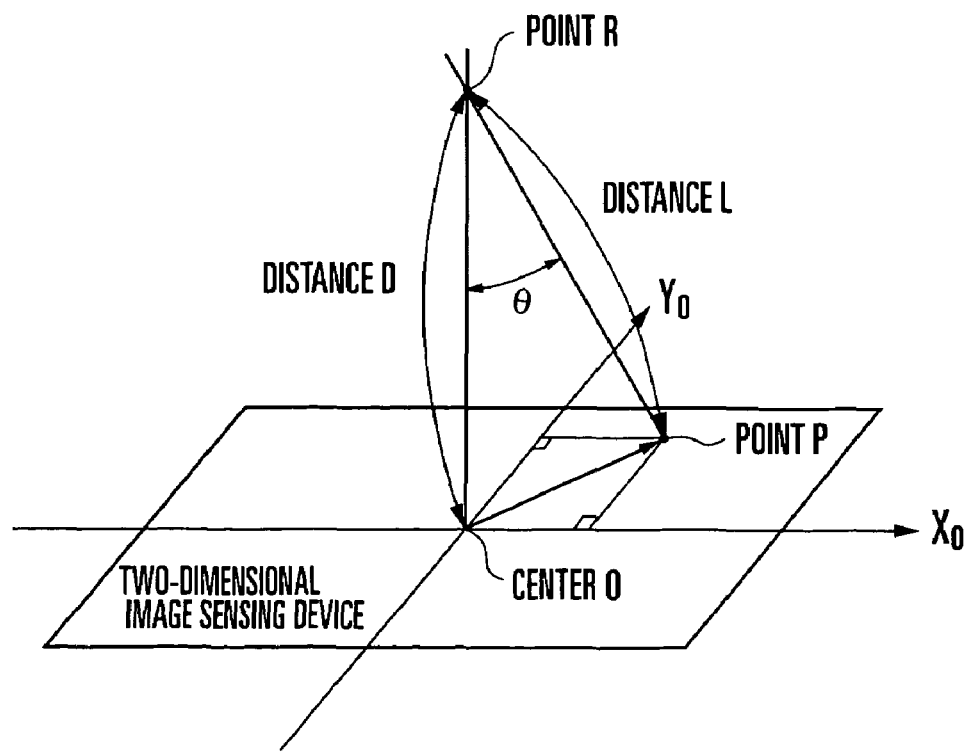

FIGS. 10A and 10B show vignetting by the optical system. FIG. 10A shows an example of characteristics of vignetting, and FIG. 10B shows a calculation example of a correction coefficient.

In the optical system arranged on the input side of an image sensing device 5, vignetting as shown in FIG. 10A occurs due to the Cosine Fourth Law or shading.

Generally, when the angle that is made by a center O of an image obtained by the image sensing device and a point P apart from the center O and viewed from a point R apart from the center O in the vertical direction by a distance D is $\theta$, the light attenuation amount at the point P is represented by $\cos^k \theta$, and the value k normally has a numerical value within the range of 1 to 4.

Correction coefficients for such a light attenuation amount cannot be prepared for all pixels.

In the present invention, as shown in FIGS. 11A and 11B, the correction coefficient of each pixel is decomposed in the two-dimensional X and Y directions and stored in advance, and calculated in accordance with the coordinate positions of each pixel.

FIGS. 11A and 11B show a method of calculating a luminance correction coefficient for vignetting.

First, as shown in FIG. 11A, correction coefficients $\alpha_{X(1)}$ to $\alpha_{X(w)}$ projected to the X-axis side and correction coefficients $\alpha_{Y(1)}$ to $\alpha_{Y(h)}$ projected to the Y-axis side are obtained in units of pixel positions (x=1 to w, y=1 to h) on an image and registered in, e.g., a ROM as a correction coefficient table.

A correction coefficient $\alpha_{P(x,y)}$ at pixel positions x and y is obtained from the product of correction coefficients in the two axial directions.

In this case, as shown in FIG. 11B, since the correction coefficients $\alpha_{X(x)}$ and $\alpha_{Y(y)}$ are approximately 1. For this reason, the correction coefficient $\alpha_{P(x,y)}$ represented by the product of the two correction coefficients can be calculated from the sum of the correction coefficients without any large error. Hence, the correction coefficient can be calculated at a high speed with a simple circuit arrangement, as compared to a method of calculating the product of two correction coefficients.

FIG. 12 shows the arrangement of a switching control section applied when luminance correction for vignetting is performed. Especially, FIG. 12 shows an arrangement corresponding to the ith (i is 1 to n) bit.

Referring to FIG. 12, a coefficient selection section 33 has a counter (CNT) 38X for calculating the x-coordinate value x of each pixel on the basis of a clock CLK synchronized with each pixel, and a counter (CNT) 38Y for calculating the y-coordinate value y of each pixel on the basis of a signal Line representing switching of pixel lines.

The corresponding correction coefficient $\alpha_{X(x)}$ is selected from the correction coefficients $\alpha_{X(1)}$ to $\alpha_{X(w)}$ by a switching section (MUX) 37X on the basis of the coordinate value x and the corresponding correction coefficient $\alpha_{Y(y)}$ is selected from the correction coefficients $\alpha_{Y(1)}$ to $\alpha_{Y(h)}$ by a switching section (MUX) 37Y on the basis of the coordinate value y. These correction coefficients are added by an adder 39.

The correction coefficient $\alpha_{P(x,y)}$ corresponding to the coordinate positions of each pixel is calculated. On the basis of clocks $\phi_0$ and $\phi_1$, switching signals $\phi_{1i}$ and $\phi_{2i}$ are generated by gates 31 and 32, respectively.

Hence, switching signals $\phi_{11}$ to $\phi_{1n}$ and $\phi_{21}$ to $\phi_{2n}$ corresponding to the correction coefficient $\alpha_{P(x,y)}$ for correcting vignetting are output to a luminance correction amplification section 1 in units of pixel positions x and y. An image signal 5A is amplified using individual gains in units of pixel positions, and an image signal 5B with corrected vignetting is obtained.

With this arrangement, the image signal can be amplified by appropriate gains in units of pixel positions, and an image with appropriate luminance can be obtained without degrading the image quality.

In addition, since luminance of an analog image signal is corrected, the signal can be processed at a high speed with a small circuit scale, and power consumption can also be reduced, as compared to a case wherein data processing done in digital domain by an image processing section.

In the above description, the correction coefficients $\alpha_{X(1)}$ to $\alpha_{X(w)}$ and $\alpha_{Y(1)}$ to $\alpha_{Y(h)}$ individually obtained in advance in units of pixel positions x and y are used. However, correction coefficients obtained in advance in units of predetermined pixel ranges may be used.

FIGS. 13A and 13B show another method of calculating a luminance correction coefficient for vignetting.

First, as shown in FIG. 13A, correction coefficients $\alpha_{X(1)}$ to $\alpha_{X(w')}$ projected to the X-axis side and correction coefficients $\alpha_{Y(1)}$ to $\alpha_{Y(h')}$ projected to the Y-axis side are obtained in units of pixel ranges (x'=1 to w', y'=1 to h') on an image and registered in, e.g., a ROM as a correction coefficient table.

The desired pixel positions x and y are converted into pixel ranges x' and y'. A correction coefficient $\alpha_{P(x',y')}$ in the pixel ranges x' and y' is obtained from the product of correction coefficients in the two axial directions, as the correction coefficient $\alpha_{P(x,y)}$ at the pixel positions x and y.

In this case as well, as described above, as shown in FIG. 13B, since the correction coefficients $\alpha_{X(x')}$ and $\alpha_{Y(y')}$ are approximately 1. For this reason, the correction coefficient $\alpha_{P(x',y')}$ represented by the product of the two correction coefficients can be calculated from the sum of the correction coefficients without any large error.

As described above, since the correction coefficients on the X- and Y-axis sides are used in units of pixel ranges on the image, the storage capacity necessary for storing correction coefficients can be decreased.

The switching control section in the gain control section 2 for realizing this operation is the same as that shown in FIG. 12. Especially, of the outputs from the counters 38X and 38Y, only the upper bits need be used to control the switching sections 37X and 37Y.

In the second embodiment, as an example of luminance correction for vignetting by the optical system, luminance correction for vignetting having the distribution $COS^k \theta$ from the frame center has been described. However, the present invention is not limited to this.

For example, when an optical system including a prism or the like is used, light attenuation, i.e., degradation in sensitivity has another distribution characteristic.

A different sensitivity degradation distribution may occur due to a factor other than the optical system.

However, when the light attenuation distribution or sensitivity degradation distribution can be represented by arithmetic expressions shown in FIG. 11B or 13B, the present invention can be applied, and the same effect as described above can be obtained.

As a method of performing luminance correction for another light attenuation distribution or sensitivity degradation distribution in units of regions, the average luminance of each color (RGB) of individual regions of an image may be regarded as a sensitivity degradation distribution, and on the basis of the distribution, individual correction coefficients may be set in units of regions and used for luminance correction.

For example, for an image obtained from the image sensing device in advance, the average luminance of each color is detected in units of regions.

A region whose luminance Y exhibits the largest value is assumed as a white region.

$Y=0.3R+0.59G+0.11B$

Luminances of the remaining regions are corrected in a similar way using correction coefficients for correcting the average luminance of each color actually obtained in the white region to white.

The luminance is corrected in all regions such that the region with the largest average luminance value becomes the white region, so appropriate white balance can be relatively easily obtained.

Instead of correcting luminances of the remaining regions with reference to the white region, luminance of each region may be corrected using an appropriate reference.

For example, in the average luminance of all colors (RGB) in an arbitrary region, a greater part of luminance distribution is shifted to the upper or lower side of a desired range (e.g., the input range of the A/D conversion section) used in subsequent processing, individual correction coefficients with which a greater part of luminance distribution falls within the range are used to correct luminance of the region.

As an arrangement for correcting luminance of an image signal on the basis of correction coefficients individually set in units of regions, a switching control section $2i$ as shown in FIG. 14 can be used.

FIG. 14 shows the arrangement of the switching control section applied when luminance is corrected in units of regions using individual correction coefficients. Especially, FIG. 14 shows an arrangement corresponding to the ith (i is 1 to n) bit.

Referring to FIG. 14, the coefficient selection section 33 has a counter (CNT) 38X' for counting the X-coordinate value of each pixel on the basis of the clock CLK synchronized with each pixel and outputting an X-coordinate value x' of each region, and a counter (CNT) 38Y' for calculating the Y-coordinate value of each pixel and outputting the Y-coordinate value y' on the basis of the signal Line representing switching of pixel lines.

A corresponding correction coefficient $\alpha A(x',y')$ is selected from individual correction coefficients $\alpha_{A(1,1)}$ to $\alpha_{A(ah,aw)}$ by the switching section (MUX) 37X on the basis of the coordinate values x' and y' in units of regions. On the basis of the clocks $\phi_0$ and $\phi_1$, the switching signals $\phi_{1i}$ and $\phi_{2i}$ are generated by the gates 31 and 32, respectively.

Hence, switching signals $\phi_{11}$ to $\phi_{1n}$ and $\phi_{21}$ to $\phi_{2n}$ corresponding to the correction coefficient $\alpha_{A(x',y')}$ for individually correcting luminance of each region are output to the luminance correction amplification section 1. The image signal 5A is amplified by a corresponding gain, and the image signal 5B corrected by individual correction coefficient in units of regions is obtained.

In this case, the reference of average luminance corresponding to a desired range used in subsequent processing, i.e., reference average luminance may be set, and correction coefficients corresponding to the regions may be calculated such that the average luminance of each region falls within the range between the maximum and minimum values of the reference average luminance.

Alternatively, conversion characteristics for performing the same calculation processing as described above may be stored as a table. The average luminance of each region may be input to read out an optimum correction coefficient from the table.

As described above, since luminance is corrected in units of regions using individual correction coefficients, the desired range, i.e., the dynamic range of the electronic camera apparatus can be effectively used in units of regions, and a high-quality image can be obtained.

Even for a region such as shade in a fine day, which has luminance much lower than that of other regions, details can be reproduced without any influence on the luminance distribution of other regions.

In setting individual correction coefficients in units of regions, the maximum correction width may be suppressed within a range to some degree.

In this case, a prominent value is not set only for the correction coefficient in an arbitrary region, the sense of incompatibility due to the luminance difference at the boundary between the region and adjacent regions in the periphery is reduced, and an image signal with a higher quality can be generated.

In the above example, luminance is corrected on the basis of the average luminance of all colors (RGB) obtained in units of regions. This method may be combined with the above-described first embodiment to individually detect the average luminance of each color in units of regions and correct the luminance in units of colors in each region on the basis of the average luminance.

With this arrangement, the desired range, i.e., the dynamic range of the electronic camera apparatus can be effectively used in units of colors in each region, and a high-quality image can be obtained.

The luminance correction section 10 of the present invention can be located at any position as far as it is located between the image sensing device 5 and an A/D conversion section 8 or between the image sensing device 5 and an analog storage section 9A.

When a correlated double sampling (CDS) circuit is connected to the output side of the image sensing device 5 to remove reset noise generated in the CCD charge detection section or 1/f noise generated in the CCD output stage, the luminance correction section 10 of the present invention may be constructed using the operational amplifier in the CDS circuit.

In the above description, the present invention is individually applied as the first or second embodiment. However, the two embodiments may be simultaneously applied.

Figure 15A:
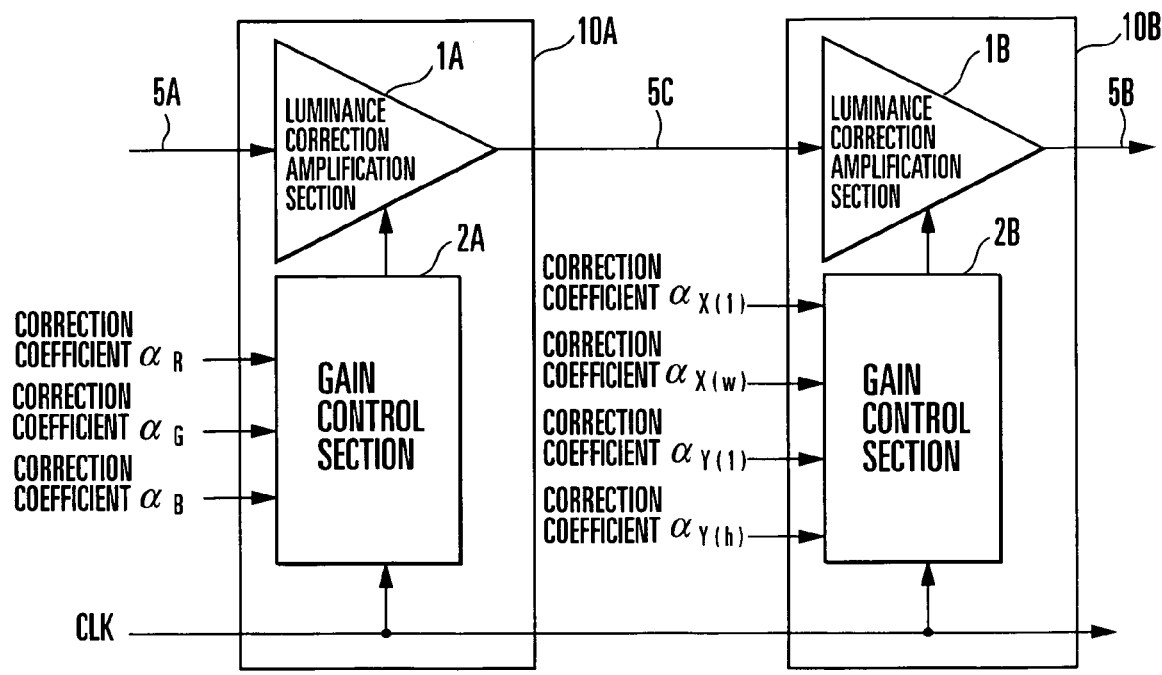
FIGS. 15A and 15B are block diagrams showing an arrangement according to another embodiment of the present invention.
Figure 15B:
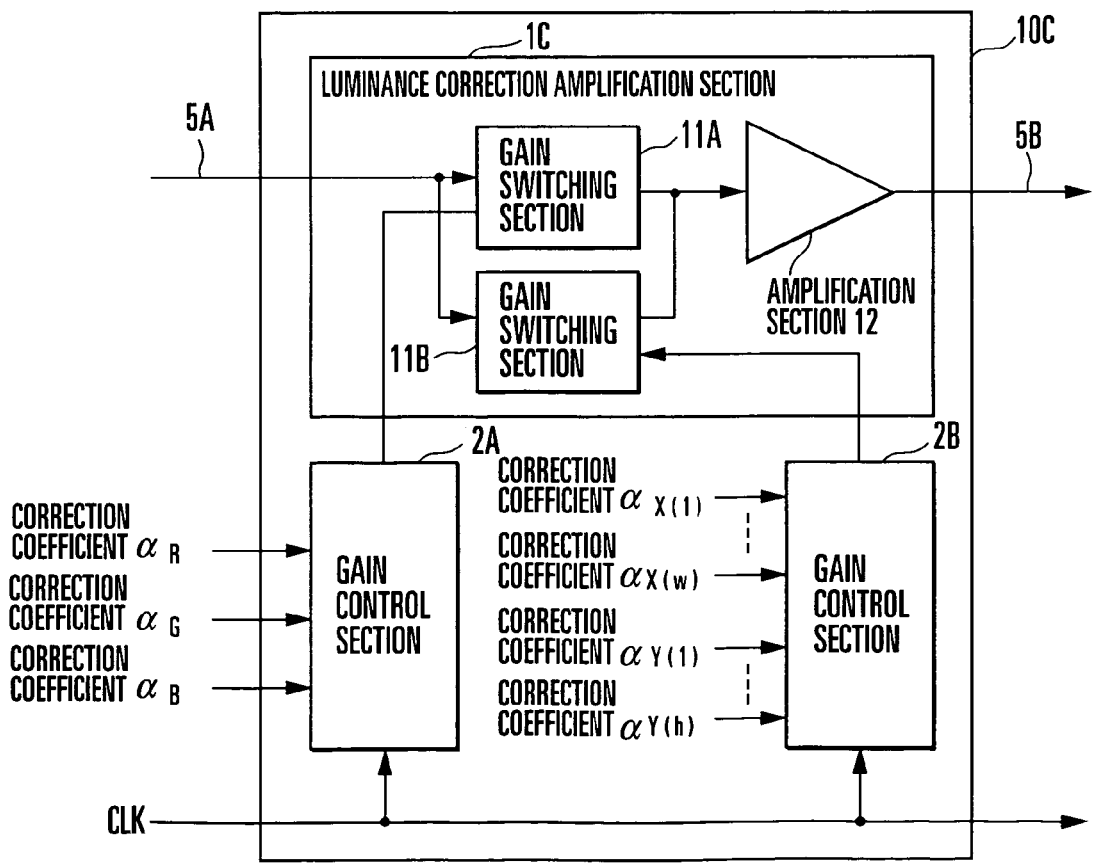
Figure 16:
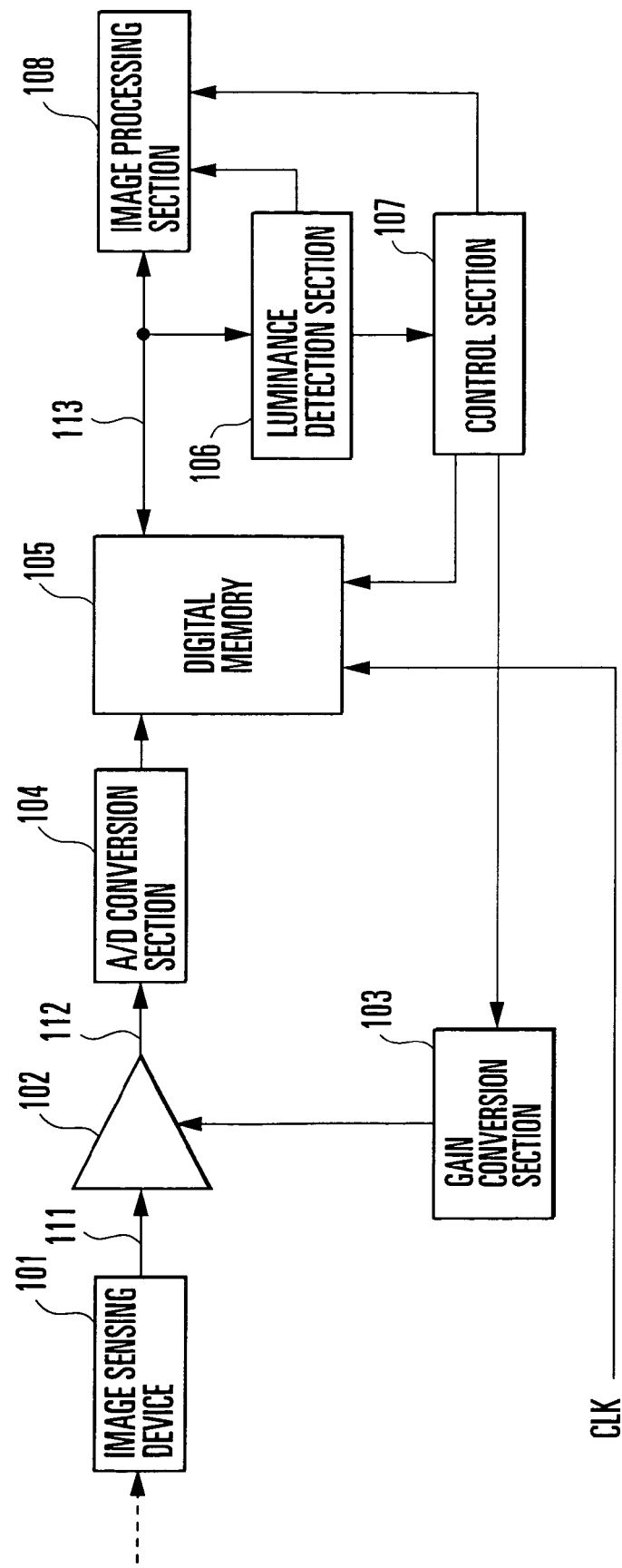
FIG. 16 is a block diagram showing the arrangement of a conventional electronic camera apparatus.

FIGS. 15A and 15B show the arrangement of the third embodiment of the present invention. FIG. 15A shows a case wherein luminance correction is performed serially, and FIG. 15B shows a case wherein luminance correction is performed at once.

Referring to FIG. 15A, a luminance correction section 10A corrects luminance of an image signal 5A from an image sensing device using individual correction coefficients $\alpha_R$, $\alpha_G$, and $\alpha_B$ in units of color pixels. A luminance correction section 10B individually corrects luminance of an image signal 5C from the luminance correction section 10A in units of pixel positions using correction coefficients $\alpha_{X(1)}$ to $\alpha_{X(w)}$ projected to the X-axis side and correction coefficients $\alpha_{Y(1)}$ to $\alpha_{Y(h)}$ projected to the Y-axis side and outputs an image signal 5B.

In this case, the luminance correction section 10B corresponding to the second embodiment is connected in series with the luminance correction section 10A corresponding to the first embodiment.

The arrangement of a luminance correction amplification section 1A and luminance correction amplification section 1B is the same as that of the luminance correction amplification section 1 described with reference to FIG. 3.

As a gain control section 2A, the switching control section $2i$ described with reference to FIG. 6 is used. As a gain control section 2B, the switching control section $2i$ described with reference to FIG. 12 is used.

Referring to FIG. 15B, two gain switching sections 11A and 11B are parallelly arranged in a luminance correction amplification section 1C. The above-described gain control sections 2A and 2B are provided in correspondence with the two gain switching sections 11A and 11B, respectively.

The gain switching sections 11A and 11B have the same arrangement as that of the above-described gain switching section 11 shown in FIG. 3.

In this case, capacitive elements of the gain switching sections 11A and 11B are selected on the basis of correction coefficients selected by the gain control sections 2A and 2B. Charges stored in the selected capacitive elements are added and transferred to the capacitive element of an amplification section 12.

As a consequence, the image signal 5A is amplified by a gain corresponding to the product of the two correction coefficients selected by the gain control sections 2A and 2B.

When different luminances are serially corrected, as shown in FIG. 15A, luminance correction is individually performed. Even when one correction amount (gain) is relatively smaller than the other correction amount (gain), accurate luminance correction can be performed.

When luminance correction is performed at once, as shown in FIG. 15B, the circuit arrangement is simplified.

As has been described above, according to the present invention, individual correction coefficients are generated from a plurality of correction coefficients in units of pixels, and each luminance information corresponding to the pixel in the image signal is corrected on the basis of the correction coefficient.

Since a new image signal in which luminance information arranged in units of pixels are individually corrected is generated, an image with appropriate luminance balance can be obtained without degrading the image quality, unlike the prior art in which luminances of pixels are corrected using one correction coefficient.

For example, when, using correction coefficients in units of pixel colors, luminances are corrected in units of pixels using correction coefficients of colors assigned to the pixels, light source correction or white balance correction optimum to the image can be performed.

In addition, when, using correction coefficients in units of coordinate positions, luminances are corrected in units of pixels using correction coefficients corresponding to the pixel positions, vignetting by the optical system can be corrected without degrading the image quality.

What is claimed is:

1. An electronic camera apparatus with the capability of correcting luminance balance in an image signal read out from an image sensing element, said image signal representing a color image constructed by a plurality of pixels and generating a desired image from the image signal, comprising:
   a luminance correction section coupled at the output of the image sensing element and operative on individual units of raw colors of said pixels, each one of said pixels each being formed from a set of predetermined units of colors and each unit of color having an analog value representing luminance information, the luminance information being discrete on a time axis, to
   A) generate individual correction coefficients for each of said predetermined colors of each said pixel from a plurality of correction coefficients
   B) correct white balance using corresponding luminance information in the image signal on the basis of each said correction coefficient, and
   C) output a new image signal used for image generation; and
   D) store the new image in a memory located within the electronic camera,
   wherein said luminance correction section comprises
   a first correction control section for sequentially generating a luminance correction amount corresponding to each pixel from a plurality of first correction coefficients on the basis of a clock signal synchronized with each luminance information in the image signal,
   a second correction control section for sequentially generating a luminance correction amount corresponding to each pixel from a plurality of second correction coefficients on the basis of a clock signal synchronized with each luminance information in the image signal, and
   a luminance correction amplification section for setting a synthesized gain as a product of a first gain corresponding to the luminance correction amount sequentially generated by said first correction control section and the luminance correction amount sequentially generated by said second correction control section to amplify the input image signal by the synthesized gain corresponding to each luminance correction amount in units of luminance information, and outputting the new image signal.

2. An apparatus according to claim 1, wherein said luminance correction section is connected in series with the image signal.

3. An apparatus according to claim 1, wherein said luminance correction section comprises
   a correction control section for sequentially generating a luminance correction amount corresponding to each pixel from the plurality of correction coefficients on the basis of a clock signal synchronized with each luminance information in the image signal, and
   a luminance correction amplification section for switching a gain in accordance with the luminance correction amount sequentially generated by said correction control section to amplify the input image signal by a gain corresponding to each luminance correction amount in units of luminance information, and outputting the new image signal.

4. An apparatus according to claim 1, wherein the plurality of correction coefficients are formed from luminance correction amounts in units of predetermined colors assigned to the pixels, and
   said luminance correction section sequentially selects and uses the luminance correction amounts corresponding to the colors assigned to the pixels as the individual correction coefficients in units of pixels.

5. An apparatus according to claim 1, wherein the plurality of correction coefficients are formed from luminance correction amounts corresponding to coordinate positions defined by two-dimensional coordinates on the color image, and
   said luminance correction section sequentially selects and uses the luminance correction amounts corresponding to the coordinate positions of the pixels as the individual correction coefficients in units of pixels.

6. An apparatus according to claim 1, wherein the plurality of correction coefficients are formed from luminance correction amounts corresponding to coordinate regions defined by two-dimensional coordinates on the color image, and
   said luminance correction section sequentially selects and uses the luminance correction amounts corresponding to the coordinate regions to which the pixels belong as the individual correction coefficients in units of pixels.

7. An apparatus according to claim 1, wherein the plurality of correction coefficients are formed from axial luminance correction amounts representing two correction distribution characteristics changing in axial directions of two coordinate axes that form two-dimensional coordinates set on the color image, and
   said luminance correction section refers to corresponding axial luminance correction amounts in units of coordinate axes on the basis of coordinate positions of the pixels and sequentially generates the luminance correction amounts corresponding to the pixels from two obtained axial luminance correction values.

8. An apparatus according to claim 1, wherein the plurality of correction coefficients are formed from axial luminance correction amounts representing two correction distribution characteristics changing in axial directions of two coordinate axes that form two-dimensional coordinates set on the color image, and said luminance correction section refers to corresponding axial luminance correction amounts in units of coordinate axes on the basis of coordinate positions of the pixels and sequentially generates and uses sums of two obtained axial luminance correction values as the luminance correction amounts corresponding to the pixels.

9. An electronic camera apparatus with the capability of correcting luminance balance in an image signal read out from an image sensing element, said image signal representing a color image constructed by a plurality of pixels and generating a desired image from the image signal, comprising:

a luminance correction section coupled at the output of the image sensing element and operative on individual units of raw colors of said pixels, each one of said pixels each being formed from a set of predetermined units of colors and each unit of color having an analog value representing luminance information, the luminance information being discrete on a time axis, to A) generate individual correction coefficients for each of said predetermined colors of each said pixel from a plurality of correction coefficients B) correct white balance using corresponding luminance information in the image signal on the basis of each said correction coefficient, and C) output a new image signal used for image generation; and D) store the new image in a memory located within the electronic camera, wherein the plurality of correction coefficients are formed from axial luminance correction amounts representing two correction distribution characteristics changing in axial directions of two coordinate axes that form two-dimensional coordinates set on the color image, and said luminance correction section refers to corresponding axial luminance correction amounts in units of coordinate axes on the basis of coordinate positions of the pixels and sequentially generates and uses products of two obtained axial luminance correction values as the luminance correction amounts corresponding to the pixels.

* * * * *